(12) United States Patent
Park et al.

(10) Patent No.: US 8,673,997 B2
(45) Date of Patent: Mar. 18, 2014

(54) POLYCARBONATE RESIN COMPOSITION AND MOLDED ARTICLE INCLUDING THE SAME

(75) Inventors: Hwan Seok Park, Uiwang-si (KR); Seung Shik Shin, Uiwang-si (KR); Min Jung Kang, Uiwang-si (KR); Jong Tae Yoon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/249,438

(22) Filed: Sep. 30, 2011

(65) Prior Publication Data

US 2012/0302663 A1    Nov. 29, 2012

(30) Foreign Application Priority Data

May 26, 2011    (KR) .................. 10-2011-0050300

(51) Int. Cl.
*C08K 5/12*    (2006.01)
(52) U.S. Cl.
USPC .......................................... 523/122; 524/165
(58) Field of Classification Search
USPC .................................. 524/155, 165; 523/122
See application file for complete search history.

(56) References Cited

U.S. PATENT DOCUMENTS

| 3,892,821 A * | 7/1975 | Koleske et al. ............... 525/411 |
| 2003/0004251 A1 * | 1/2003 | Hashimoto et al. ........... 524/456 |
| 2003/0083442 A1 | 5/2003 | Nishihara et al. |
| 2006/0281860 A1 * | 12/2006 | Higuchi et al. ................. 525/89 |
| 2007/0048527 A1 | 3/2007 | Agarwal et al. |
| 2007/0072960 A1 | 3/2007 | Ma et al. |
| 2008/0004373 A1 * | 1/2008 | Volkers et al. ................. 523/200 |
| 2008/0015292 A1 * | 1/2008 | Lens et al. ..................... 524/115 |
| 2008/0051508 A1 | 2/2008 | Hayata et al. |
| 2008/0076866 A1 | 3/2008 | Mitsuhashi et al. |
| 2010/0267880 A1 * | 10/2010 | Isozaki et al. ................. 524/420 |

FOREIGN PATENT DOCUMENTS

| EP | 1420047 A1 | 5/2004 |
| EP | 1541632 A1 | 6/2005 |
| JP | 3619193 B2 | 2/2005 |
| KR | 10-2008-0048983 A | 6/2008 |
| WO | 2007/024456 A1 | 3/2007 |

OTHER PUBLICATIONS

European Search Report in counterpart European Application No. 11193796.7 dated Apr. 16, 2012, pp. 1-4.
Office Action in counterpart Korean Application No. 10-2011-0050300 dated Oct. 30, 2013, pp. 1-4.

* cited by examiner

*Primary Examiner* — John Uselding
(74) *Attorney, Agent, or Firm* — Additon, Higgins, Pendleton & Ashe, P.A.

(57) ABSTRACT

A polycarbonate resin composition includes about 100 parts by weight of a base resin including about 45 to about 86 parts by weight of a polycarbonate resin (A), about 10 to about 45 parts by weight of a polysiloxane-polycarbonate copolymer (B) and about 4 to about 10 parts by weight of an aromatic vinyl graft copolymer (C), about 0.03 to about 5 parts by weight of a sulfonate flame retardant (D) based on about 100 parts by weight of the base resin, and about 1 to about 10 parts by weight of a polycaprolactone polymer (E) based on about 100 parts by weight of the base resin.

10 Claims, No Drawings

POLYCARBONATE RESIN COMPOSITION AND MOLDED ARTICLE INCLUDING THE SAME

CROSS-REFERENCE TO RELATED APPLICATION

This application claims priority under 35 USC Section 119 from Korean Patent Application No. 10-2011-0050300, filed May 26, 2011, the entire disclosure of which is incorporated herein by reference.

FIELD OF THE INVENTION

The present invention relates to a polycarbonate resin composition and a molded article including the same.

BACKGROUND OF THE INVENTION

In polycarbonate/acrylonitrile butadiene styrene (PC/ABS) compositions including PC and ABS copolymers, PC generally improves impact strength and heat resistance, and ABS enhances processability and chemical resistance. As such, PC/ABS compositions can be used for various purposes due to their excellent physical properties as compared with ABS and cost efficiency as compared with PC.

For example, PC/ABS compositions may be used in the production of housings for electronic products. Generally such products require flame retardancy. Adding 10 wt % triphenyl phosphate (TPP) to a PC/ABS composition can impart about V0-level flame retardancy. In this case, however, evaporation may occur during a bridging or extrusion process due to the low melting point of TPP.

Thus, bromide, phosphate ester, and sulfonate flame retardants may be considered. Phosphate ester flame retardants, which are non-halogenated flame retardants, are environmentally friendly as compared with bromide flame retardants. Phosphate ester flame retardants, however, generally must be added in an amount of 10 wt % or more to provide a UL94 flammability rating of about V0 or more.

Phosphorus flame retardants including resorcinol bis(diphenyl phosphate) (RDP) or bisphenol A bis(diphenyl phosphate) (BDP) may also be used. Compositions including these flame retardants can be injection molded at 250° C. because RDP and BDP increase the flow index. However, the use of RDP or BDP as flame retardants is regulated due to recent environmental restrictions.

Sulfonate flame retardants can provide excellent flame retardancy even in an amount as low as 1 wt % or less and also provide advantages associated with non-halogenated flame retardants. However, when sulfonate flame retardants are used for a composition including PC and ABS copolymers, a high injection molding temperature of 280° C. or more is generally required. When the injection, molding temperature becomes high, impact strength and heat resistance can be deteriorated due to decomposition of resin or the like.

Thus, there is a need for a polycarbonate resin that has enhanced fluidity and improved impact strength, and is capable of maintaining gloss and flame retardancy.

SUMMARY OF THE INVENTION

The present invention provides a polycarbonate resin composition that can have enhanced fluidity and improved impact strength, and can be injection molded even at a low temperature to maintain excellent flame retardancy and gloss. The polycarbonate resin composition includes a polycarbonate resin (A), a polysiloxane-polycarbonate copolymer (B), an aromatic vinyl graft copolymer (C), a sulfonate flame retardant (D), and a polycaprolactone polymer (E). In one embodiment, the polycarbonate resin composition includes about 100 parts by weight of a base resin including about 45 to about 86 parts by weight of the polycarbonate resin (A), about 10 to about 45 parts by weight of the polysiloxane-polycarbonate copolymer (B), and about 4 to about 10 parts by weight of the aromatic vinyl graft copolymer (C); about 0.03 to about 5 parts by weight of the sulfonate flame retardant (D) based on about 100 parts by weight of the base resin; and about 1 to about 10 parts by weight of the polycaprolactone polymer (E) based on about 100 parts by weight of the base resin.

The sulfonate flame retardant (D) and the polycaprolactone polymer (E) may be included in a weight ratio of about 1:0.3 to about 1:250.

The polycarbonate resin may have a flow index of about 100 to about 130 g/10 min at 300° C. and 1.2 kg according to ISO 1133.

The aromatic vinyl graft copolymer (C) may be a graft polymer of a polybutadiene rubber with an aromatic vinyl monomer and a vinyl cyanide monomer, wherein the aromatic vinyl monomer and the vinyl cyanide monomer may be present in a weight ratio of about 60:40 to about 80:20.

The sulfonate flame retardant (D) may include an alkali metal perfluoroalkane sulfonate, ammonium perfluoroalkane sulfonate, alkali metal salt of an aromatic sulfonate, an alkaline earth metal salt of an aromatic sulfonates, or a combination thereof.

The polycaprolactone polymer (E) may include a polycaprolactone homopolymer; a copolymer of caprolactone and at least one monomer copolymerizable with polycaprolactone such as alkylene oxide, tetrahydrofuran, styrene, methyl methacrylate, butadiene, and combinations thereof; and combinations of one or more polycaprolactone homopolymers and/or one or more copolymers of caprolactone and at least one monomer copolymerizable with polycaprolactone.

The polycarbonate resin composition may further include one or more additives, such as lubricant additives, antioxidants, chemical resistant additives, surfactants, nucleating agents, coupling agents, fillers, plasticizers, impact modifiers, antimicrobial agents, releasing agents, heat stabilizers, photostablizers, compatibilizers, inorganic additives, coloring agents, stabilizers, antifriction agents, anti-static agents, pigments, dyes, fire-proofing agents, and the like, and combinations thereof.

The resin composition may have a UL94 flammability rating of about V0 or more, measured on a 2 mm-thick specimen, have a flow index of about 30 g/10 min or more, evaluated at 220° C. and a load of 10 kg according to ISO 1113, have an Izod impact strength of about 23 kg·cm/cm or more, evaluated according to ASTM D-256 (⅛", notched), and have a 60° gloss of about 97 or more, evaluated according to ASTM D528.

The present invention also provides a molded article using the polycarbonate resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The polycarbonate resin composition includes a polycarbonate resin (A), a polysiloxane-polycarbonate copolymer (Si—PC copolymer) (B), an aromatic vinyl graft copolymer (C), a sulfonate flame retardant (D), and a polycaprolactone polymer (E). Hereinafter, each component will be described in detail.

(A) Polycarbonate Resin

The polycarbonate resin (A) may be prepared by reaction of one or more diphenols represented by Formula 1 with phosgene, halogen formate or carbonic acid diester:

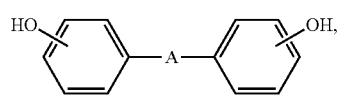

[Formula 1]

wherein A represents a single bond, C1 to C5 alkylene, C1 to C5 alkylidene, C5 to C6 cycloalkylidene, —S—, or —SO$_2$—.

Examples of the diphenols represented by Formula 1 may include without limitation 4,4'-dihydroxydiphenyl, 2,2-bis (4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof. In exemplary embodiments, 2,2-bis(4-hydroxyphenyl)propane (also referred to as bisphenol A), 2,2-bis(3,5-dichloro-4-hydroxyphenyl)propane, and/or 1,1-bis(4-hydroxyphenyl)cyclohexane may be used. Further, the diphenols may also include resorcinol and/or hydroquinone.

The polycarbonate resin (A) may be a homopolymer using one kind of dihydric phenol, a copolymer or a mixture of polymers using at least two kinds of dihydric phenols, or a combination of one or more homopolymers and/or one or more copolymers.

The polycarbonate resin (A) may have a weight average molecular weight of about 5,000 to about 200,000 g/mol, for example about 13,000 to about 80,000 g/mol, and as another example about 15,000 to about 50,000 g/mol.

The polycarbonate resin (A) may be a linear polycarbonate resin, a branched polycarbonate resin, a polyester carbonate copolymer resin, or a combination thereof.

In exemplary embodiments, the polycarbonate resin (A) may be a high-fluidity polycarbonate resin having a high flow index. In one embodiment, the polycarbonate resin may have a flow index of about 90 to about 130 g/10 min, for example about 100 to about 130 g/10 min at 300° C. and 1.2 kg according to ISO 1133. Within this range, both mechanical properties and fluidity in injection molding can be satisfied.

The polycarbonate resin composition may the polycarbonate resin (A) in an amount of about 45 to about 86 parts by weight, for example about 47 to about 80 parts by weight, and as another example about 50 to about 70 parts by weight, of about 100 parts by weight of a base resin including (A), (B), and (C). In some embodiments, the polycarbonate resin composition may include the polycarbonate resin (A) in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, or 86 parts by weight. Further, according to some embodiments of the present invention, the amount of the polycarbonate resin (A) can be in a range from about any of the foregoing amounts to about any other of the foregoing amounts.

When the polycarbonate resin composition includes the polycarbonate resin (A) in an amount within this range, stable mechanical strength and flame retardancy can be exhibited.

(B) Polysiloxane-Polycarbonate Copolymer (Si—PC Copolymer)

The polysiloxane-polycarbonate copolymer (B) includes a polycarbonate block and a polysiloxane block;

The polycarbonate block may include a structural unit derived from the polycarbonate resin.

The polysiloxane block may include a structural unit represented by Formula 2:

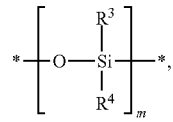

wherein:

$R^3$ and $R^4$ may be the same or different and are independently hydrogen, substituted or unsubstituted C1 to C20 alkyl, substituted or unsubstituted C2 to C20 alkenyl, substituted or unsubstituted C2 to C20 alkynyl, substituted or unsubstituted C1 to C20 alkoxy, substituted or unsubstituted C3 to C30 cycloalkyl, substituted or unsubstituted C3 to C30 cycloalkenyl, substituted or unsubstituted C3 to C30 cycloalkynyl, substituted or unsubstituted C6 to C30 aryl, substituted or unsubstituted C6 to C30 aryloxy, or NRR', wherein R and R' are the same or different and are independently hydrogen or substituted or unsubstituted C1 to C20 alkyl, and $2 \leq m < 10,000$.

In exemplary embodiments, in Formula 2, m may be in the range from about 2 to about 10,000, for example about 2 to about 1,000, as another example about 10 to about 100, and as another example about 25 to about 80. Within this range, excellent impact resistance can be obtained and proper viscosity can be maintained, thereby providing favorable conditions for extrusion.

The polysiloxane-polycarbonate copolymer (B) may include about 1 to about 99 wt % of the polycarbonate block and about 1 to about 99 wt % of the polysiloxane block, based on 100% of the polysiloxane-polycarbonate copolymer (B). In exemplary embodiments, the polysiloxane-polycarbonate copolymer may include about 40 to about 80 wt % of the polycarbonate block and about 20 to about 60 wt % of the polysiloxane block. Within this range, excellent impact resistance can be obtained. In other exemplary embodiments, the polysiloxane-polycarbonate copolymer may include about 80 to about 95 wt % of the polycarbonate block and about 5 to about 20 wt % of the polysiloxane block.

In some embodiments, the polysiloxane-polycarbonate copolymer (B) may include the polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate block can be in a range from about any of the foregoing amounts to about any other of the foregoing amounts.

In some embodiments, the polysiloxane-polycarbonate copolymer (B) may include the polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polysiloxane block can be in a range from about any of the foregoing amounts to about any other of the foregoing amounts.

The polysiloxane-polycarbonate copolymer (B) may have a weight average molecular weight of about 10,000 to about 80,000 g/mol, for example about 15,000 to about 30,000 g/mol. Within this range, excellent impact resistance can be obtained.

The polysiloxane-polycarbonate copolymer (B) may have a melt index (MI) of about 3 to about 100 g/10 min, for example about 10 to about 70 g/10 min at 300° C. and 1.2 kgf. In one embodiment, the polysiloxane-polycarbonate copolymer (B) may have an MI of about 20 to about 50 g/10 min. Within this range, both excellent mechanical properties and excellent fluidity in injection molding can be obtained.

The polysiloxane-polycarbonate copolymer (B) may be prepared by any method known in the art. In one embodiment, the polysiloxane-polycarbonate copolymer may be prepared by copolymerization of a bivalent phenolic compound with a bivalent phenolic compound having a siloxane group. Copolymerization may be conducted by any known method, e.g., interfacial polycondensation, emulsion polymerization, and the like. The polysiloxane-polycarbonate copolymer may include commercially available products, e.g., Taflon produced by Idemitsu Chemicals.

The polycarbonate resin composition may include the polysiloxane-polycarbonate copolymer (B) in an amount of about 10 to about 45 parts by weight, for example about 24 to about 44 parts by weight, of about 100 parts by weight of the base resin including (A), (B), and (C). In some embodiments, the polycarbonate resin composition may include the polysiloxane-polycarbonate copolymer (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 parts by weight. Further, according to some embodiments of the present invention, the amount of the polysiloxane-polycarbonate copolymer (B) can be in a range from about any of the foregoing amounts to about any other of the foregoing amounts.

When the polycarbonate resin composition includes the polysiloxane-polycarbonate copolymer (B) in an amount within this range, the composition can have an excellent balance of properties such as flame retardancy and fluidity.

(C) Aromatic Vinyl Graft Copolymer

The aromatic vinyl graft copolymer (C) may be prepared by polymerization of a rubber polymer, an aromatic vinyl monomer graft-polymerizable with the rubber polymer and a monomer copolymerizable with the aromatic vinyl monomer.

Examples of the rubber polymer may include without limitation diene rubbers, such as polybutadiene, poly(styrene-butadiene), poly(acrylonitrile-butadiene), and the like, saturated rubbers obtained by addition of hydrogen to the diene rubbers, isoprene rubber, chloroprene rubber, acrylic rubbers, such as poly(butyl acrylic acid), tripolymers of ethylene/propylene/diene monomers (EPDM), and the like, and combinations thereof. In exemplary embodiments, the rubber can include a diene rubber, such as poly butadiene.

The aromatic vinyl graft copolymer (C) may include the rubber polymer in an amount of about 5 to about 65% by weight (wt %), for example about 20 to about 60 wt %. In some embodiments, the aromatic vinyl graft copolymer (C) may include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the amount of the rubber polymer can be in a range from about any of the foregoing amounts to about any other of the foregoing amounts.

The rubber polymer may have an average particle size of about 0.1 to about 4 μm, for example about 0.2 to about 2 μm. Within this range, excellent impact strength and appearance can be obtained.

Examples of the aromatic vinyl monomer graft-polymerizable with the rubber polymer may include, without being limited to, styrene, α-methylstyrene, β-methylstyrene, p-methylstyrene, para-t-butylstyrene, ethylstyrene, vinylxylene, monochlorostyrene, dichlorostyrene, dibromostyrene, vinylnaphthalene, and the like, and combinations thereof. In exemplary embodiments, the aromatic vinyl monomer is styrene.

The aromatic vinyl graft copolymer (C) may include the aromatic vinyl monomer in an amount of about 30 to about 90 wt %. In some embodiments, the aromatic vinyl graft copolymer (C) may include the aromatic vinyl monomer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl monomer can be in a range from about any of the foregoing amounts to about any other of the foregoing amounts.

Examples of the monomer copolymerizable with the aromatic vinyl monomer may include without limitation acrylonitrile, methacrylonitrile, and the like, and combinations thereof. In exemplary embodiments, the monomer copolymerizable with the aromatic vinyl monomer is acrylonitrile.

The aromatic vinyl graft copolymer (C) may include the copolymerizable monomer in an amount of about 1 to about 10 wt %. In some embodiments, the aromatic vinyl graft copolymer (C) may include the copolymerizable monomer in an amount of about 1, 2, 3, 4, 5, 6, 7, 8, 9, or 10 wt %. Further, according to some embodiments of the present invention, the amount of the copolymerizable monomer can be in a range from about any of the foregoing amounts to about any other of the foregoing amounts.

The aromatic vinyl graft copolymer (C) may be an acrylonitrile butadiene-styrene copolymer (ABS) prepared by emulsion grafting of polybutadiene latex (PBL) with a styrene monomer and acrylonitrile in a weight ratio of about 60:40 to about 80:20.

The polycarbonate resin composition may include the aromatic vinyl graft copolymer (C) in an amount of about 4 to about 10 parts by weight, of about 100 parts by weight of the base resin including (A), (B), and (C). In some embodiments, the polycarbonate resin composition may include the aromatic vinyl graft copolymer (C) in an amount of about 4, 5, 6, 7, 8, 9, or 10 parts by weight. Further, according to some embodiments of the present invention, the amount of the aromatic vinyl graft copolymer (C) can be in a range from about any of the foregoing amounts to about any other of the foregoing amounts.

When the polycarbonate resin composition includes the aromatic vinyl graft copolymer (C) in an amount within this range, proper impact strength can be maintained.

(D) Sulfonate Flame Retardant

Examples of the sulfonate flame retardant may include without limitation alkali metal perfluoroalkane sulfonates, ammonium perfluoroalkane sulfonates, alkali metal salts of aromatic sulfonates, alkaline earth metal salts of aromatic sulfonates, and the like, and combinations thereof. In exemplary embodiments, alkali metal perfluoroalkane sulfonates or ammonium perfluoroalkane sulfonates may be used. As used herein, perfluoroalkanes may include C1 to C8 alkyl groups.

Examples of the alkali metal perfluoroalkane sulfonates and ammonium perfluoroalkane sulfonates may include, without being limited to, sodium perfluorobutane sulfonate, potassium perfluorobutane sulfonate, sodium perfluoromethylbutane sulfonate, potassium perfluoromethylbutane sulfonate, sodium perfluoroethane sulfonate, potassium perfluoroethane sulfonate, sodium perfluoropropane sulfonate, potassium perfluoropropane sulfonate, sodium perfluorohexane sulfonate, potassium perfluorohexane sulfonate, sodium perfluoroheptane sulfonate, potassium perfluoroheptane sulfonate, sodium perfluorooctane sulfonate, potassium perfluorooctane sulfonate, tetraethylammonium perfluorobutane sulfonate, tetraethylammonium perfluoromethylbutane sulfonate, and the like, and combinations thereof. In exemplary embodiments, potassium perfluorobutane sulfonate (KPFBS) may be used.

Examples of the alkali metal salts or alkaline earth metal salts of the aromatic sulfonates may include, without being limited to, potassium diphenylsulfone-3-sulfonate, dipotassium diphenylsulfone-3,3'-disulfonate, dipotassium 4,2',4', 5'-tetrachlorodiphenylsulfone-3,5-disulfonate, dipotassium diphenylsulfone-3,3'-disulfonate, and the like, and combinations thereof.

The polycarbonate resin composition may include the sulfonate flame retardant (D) in an amount of about 0.03 to about 5 parts by weight, for example about 0.1 to about 3 parts by weight, based on about 100 parts by weight of the base resin including (A), (B), and (C). In some embodiments, the polycarbonate resin composition may include the sulfonate flame retardant (D) in an amount of about 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the sulfonate flame retardant (D) can be in a range from about any of the foregoing amounts to about any other of the foregoing amounts.

When the polycarbonate resin composition includes the sulfonate flame retardant (D) in an amount within this range, appropriate flame retardancy and gloss can be maintained in the mixture.

In one embodiment, the sulfonate flame retardant (D) and the polycaprolactone polymer (E) may be added in a weight ratio of about 1:0.3 to about 1:250 in the composition. In exemplary embodiments, the sulfonate flame retardant (D) and the polycaprolactone polymer (E) may be added in a weight ratio of about 1:0.3 to about 1:80, and in other exemplary embodiments, the sulfonate flame retardant (D) and the polycaprolactone polymer (E) may be present in a weight ratio of about 1:10 to about 1:80.

When the polycarbonate resin composition includes the sulfonate flame retardant (D) and the polycaprolactone polymer (E) in a weight ratio within this range, improved flame retardancy, fluidity, and gloss can be exhibited in the mixture.

(E) Polycaprolactone Polymer

Examples of the polycaprolactone polymer (E) may include without limitation caprolactone homopolymers, copolymers obtained by polymerization of caprolactone with monomers copolymerizable with caprolactone, and combinations thereof.

Examples of the monomers copolymerizable with the caprolactone may include, without being limited to, alkylene oxides, such as β-propiolactone, pivalolactone, butyrolactone, ethylene oxide, 1,2-propylene oxide, and 1,3-propylene oxide; tetrahydrofuran; unsaturated group containing monomers, such as styrene, methyl methacrylate, and butadiene; and the like, and combinations thereof.

When a copolymer is used, the copolymer may include caprolactone in an amount of about 40 to about 98 wt %, for example about 45 to about 90 wt %. In some embodiments, the copolymer may include caprolactone in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt %. Further, according to some embodiments of the present invention, the amount of caprolactone can be in a range from about any of the foregoing amounts to about any other of the foregoing amounts.

The polycaprolactone polymer (E) may have a number average molecular weight of about 1,000 to about 100,000 g/mol. Within this range, good heat stability, transparency, and processability can be obtained.

The polycarbonate resin composition may include the polycaprolactone polymer (E) in an amount of about 1 to about 10 parts by weight, for example about 1 to about 8 parts by weight, based on about 100 parts by weight of the base resin including (A), (B), and (C). In some embodiments, the polycarbonate resin composition may include the polycaprolactone polymer (E) in an amount of about 1, 2, 3, 4, 5, 6, 7, 8, 9, or parts by weight. Further, according to some embodiments of the present invention, the amount of the polycaprolactone polymer (E) can be in a range from about any of the foregoing amounts to about any other of the foregoing amounts.

When the polycarbonate resin composition includes the polycaprolactone polymer (E) in an amount within this range, high fluidity and impact strength can be obtained.

In addition to these components, the polycarbonate resin composition may further include one or more other additives. Examples of the other additives may include, without being limited to, lubricant additives, antioxidants, chemical resistant additives, surfactants, nucleating agents, coupling agents, fillers, plasticizers, impact modifiers, antimicrobial agents, releasing agents, heat stabilizers, photostablizers, compatibilizers, inorganic additives, coloring agents, stabilizers, antifriction agents, anti-static agents, pigments, dyes, fireproofing agents, and the like, and combinations thereof. The polycarbonate resin composition may include the additives in an amount of about 0.1 to about 3 parts by weight based on about 100 parts by weight of the base resin including (A), (B), and (C), although the present invention is not limited to the foregoing amounts.

The resin composition may have a UL94 flammability rating of about V0 or more, measured on a 2 mm-thick specimen.

The resin composition may have a flow index of about 30 g/10 min or more, for example about 32 to about 100 g/10 min, evaluated at 220° C. and a load of 10 kg according to ISO 1113. In one embodiment, the resin composition may have a flow index of about 34 to about 86 g/10 min.

The resin composition may have an Izod impact strength of about 23 kg·cm/cm or more, for example about 23 to about 90 kg·cm/cm, evaluated according to ASTM D-256 (⅛", notched). In one embodiment, the resin composition may have an Izod impact strength of about 25 to about 55 kg·cm/cm.

The resin composition may have a 60° gloss of about 97 or more, for example about 97 to about 120, evaluated according to ASTM D528. In one embodiment, the resin composition may have a 60° gloss of about 97 to about 102.

The present invention also provides a molded article using the polycarbonate resin composition. Any molding method known to those skilled in the art may be used.

Hereinafter, the constitution and functions of the present invention will be explained in more detail with reference to the following examples. These examples are provided for illustrative purposes only and are not to be in any way construed as limiting the present invention.

A description of details apparent to those skilled in the art will be omitted.

Details of components used in Examples and Comparative Examples are described as follows.

(A) Polycarbonate resin: FX-8800 having a flow index of 120 g/10 min at 300° C. and 1.2 kgf according to ISO 1133, produced by Cheil Industries Inc.

(B) Polysiloxane-polycarbonate (Si—PC) copolymer: Tarflon having a flow index of 27 g/10 min at 300° C. and 1.2 kgf according to ISO 1133, produced by Idemitsu Chemicals.

(C) Aromatic vinyl graft copolymer: g-ABS, prepared through emulsion graft of 60 parts by weight of a butadiene rubber having an average diameter of 310 nm and 40 parts by weight of a vinyl polymer including 75 wt % of styrene and 25 wt % of acrylonitrile by a method known in the art.

(D) Sulfonate flame retardant: Potassium perfluorobutane sulfonate, FR-205 produced by 3M.

(D') Flame retardants other than sulfonate flame retardant, for example: Bisphenol-A bis(diphenyl phosphate) (BDP).

(E) Polycaprolactone (PCL) polymer: Placcel HIP having a number average molecular weight of 10,000 g/mol and a glass transition temperature of −60° C., produced by Daicel Chemical.

(E') Fluidizing agents other than polycaprolactone polymer, for example: S101N, produced by UMG.

Examples 1 to 7

The above components are mixed according to compositions listed in Table 1 (parts by weight). Then, 0.5 parts by weight of polytetrafluoroethylene powder as an additive, 0.5 parts by weight of Irganox 1076 (Ciba) as an antioxidant, and 0.5 parts by weight of Luwax (BASF) as a lubricant are added to the mixture, followed by mixing in a mixer and extrusion using a biaxial extruder (L/D=35 and φ=45 mm). The extruded product is formed into pellets, and then injection-molded into a specimen at 250° C. using a 10 oz injection molding machine. The specimen is left at 23° C. and 50% RH for 48 hours.

Comparative Examples 1 to 6

Specimens are prepared in the same manner as in Examples 1 to 7 except that the components are changed according to Table 2.

TABLE 1

|  | Example 1 | Example 2 | Example 3 | Example 4 | Example 5 | Example 6 | Example 7 |
|---|---|---|---|---|---|---|---|
| (A) | 70 | 70 | 70 | 50 | 70 | 70 | 70 |
| (B) | 24 | 24 | 24 | 44 | 24 | 24 | 24 |
| (C) | 6 | 6 | 6 | 6 | 6 | 6 | 6 |
| (D) | 0.1 | 0.1 | 0.1 | 0.1 | 1 | 3 | 0.1 |
| (D') | — | — | — | — | — | — | — |
| (E) | 1 | 3 | 5 | 5 | 5 | 1 | 8 |
| (E') S101N | — | — | — | — | — | — | — |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| (A) | 70 | 70 | 70 | 70 | 70 | 70 |
| (B) | 24 | 24 | 24 | 24 | 24 | 24 |
| (C) | 6 | 6 | 6 | 6 | 6 | 6 |
| (D) | 0.1 | 0.1 | — | 0.02 | 6 | 0.1 |
| (D') | — | — | 0.1 | — | — | — |
| (E) | 0.5 | 11 | 1 | 1 | 1 | — |
| (E') S101N | — | — | — | — | — | 1 |

Experimental Example

Evaluation of Physical Properties of Polycarbonate Resin Compositions

Physical properties of the specimens prepared in Examples and Comparative Examples are measured as follows, and results are shown in Tables 3 and 4.

<Methods of Evaluation of Physical Properties>

1. Flame Retardancy

The flame retardancy of a 2 mm-thick specimen is measured in accordance with the UL94 flammability rating.

2. Flow Index (g/10 min)

Flow index is evaluated at 220° C. and a load of 10 kg in accordance with ISO 1113.

3. Izod Impact Strength (kg·cm/cm)

Izod impact strength is evaluated in accordance with ASTM D-256 (⅛", notched).

4. 60° Gloss

60° gloss is evaluated using a BYK-Gardner gloss meter in accordance with ASTM D528.

TABLE 3

| | Example 1 | Example 2 | Example 3 | Example 4 | Example 5 | Example 6 | Example 7 |
|---|---|---|---|---|---|---|---|
| Flame retardancy | V0 | V0 | V0 | V0 | V0 | V0 | V0 |
| Flow index (g/10 min) | 34 | 51 | 67 | 38 | 72 | 37 | 86 |
| Impact strength (kg · cm/cm) | 41 | 34 | 30 | 38 | 26 | 28 | 23 |
| Gloss | 97.3 | 97.0 | 99.3 | 98.5 | 101.3 | 97.8 | 98.7 |

TABLE 4

| | Comparative Example 1 | Comparative Example 2 | Comparative Example 3 | Comparative Example 4 | Comparative Example 5 | Comparative Example 6 |
|---|---|---|---|---|---|---|
| Flame retardancy | V0 | V0 | Fail | V2 | V0 | V1 |
| Flow index (g/10 min) | 27 | 92 | 35 | 32 | 34 | 27 |
| Impact strength (kg · cm/cm) | 42 | 11 | 33 | 40 | 15 | 31 |
| Gloss | 92.4 | 97.2 | 97.0 | 97.5 | 91.4 | 97.4 |

As shown in Tables 3 and 4, the polycarbonate resin compositions including the PCL as a fluidizing agent and the sulfonate flame retardant as a flame retardant in a predetermined content exhibit good fluidity and impact strength while maintaining proper flame retardancy and gloss. However, when the PCL and the sulfonate flame retardant are used as a fluidizing agent and as a flame retardant, respectively, but in amounts outside the invention, there are limitations with regard to improving fluidity, impact strength, flame retardancy, and gloss at the same time. Further, when the same amount BDP replaced the sulfonate flame retardant as a flame retardant, the composition did not exhibit sufficient flame retardancy. In addition, when a fluidizing agent other than PCL is used, the composition did not have improved fluidity.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   about 100 parts by weight of a base resin including about 45 to about 86 parts by weight of a polycarbonate resin (A), about 10 to about 45 parts by weight of a polysiloxane-polycarbonate copolymer (B), and about 4 to about 10 parts by weight of an aromatic vinyl graft copolymer (C), wherein the aromatic vinyl graft copolymer (C) is a graft copolymer of a rubber polymer with an aromatic vinyl monomer graft-polymerizable with the rubber polymer and a monomer copolymerizable with the aromatic vinyl monomer;
   0.03 to 5 parts by weight of a sulfonate flame retardant (D) comprising an alkali metal perfluoroalkane sulfonate, ammonium perfluoroalkane sulfonate, or a combination thereof based on about 100 parts by weight of the base resin; and
   1 to 10 parts by weight of a polycaprolactone polymer (E) based on about 100 parts by weight of the base resin,
   wherein the total amount of the polysiloxane-polycarbonate copolymer (B) and the aromatic vinyl graft copolymer (C) is at least about 30 wt % based on 100 wt % of the base resin including (A), (B) and (C).

2. The polycarbonate resin composition of claim 1, comprising the sulfonate flame retardant (D) and the polycaprolactone polymer (E) in a weight ratio of about 1:0.3 to about 1:250.

3. The polycarbonate resin composition of claim 1, wherein the polycarbonate resin has a flow index of about 100 to about 130 g/10 min at 300° C. and 1.2 kg according to ISO 1133.

4. The polycarbonate resin composition of claim 1, wherein the aromatic vinyl graft copolymer is a graft polymer of a polybutadiene rubber with an aromatic vinyl monomer and a vinyl cyanide monomer, and the aromatic vinyl monomer and the vinyl cyanide monomer are present in a weight ratio of about 60:40 to about 80:20.

5. The polycarbonate resin composition of claim 1, wherein the polycaprolactone polymer (E) comprises a caprolactone homopolymer; a copolymer of caprolactone and at least one copolymerizable monomer comprising an alkylene oxide, tetrahydrofuran, styrene, methyl methacrylate, butadiene or a combination thereof; or a combination thereof.

6. The polycarbonate resin composition of claim 1, wherein the polycarbonate resin composition further comprises at least one additive selected from lubricant additives, antioxidants, chemical resistant additives, surfactants, nucleating agents, coupling agents, fillers, plasticizers, impact modifiers, antimicrobial agents, releasing agents, heat stabilizers, photostablizers, compatibilizers, inorganic additives, coloring agents, stabilizers, antifriction agents, anti-static agents, pigments, dyes, fireproofing agents, and combinations thereof.

7. The polycarbonate resin composition of claim 1, wherein the resin composition has a UL94 flammability rating of about V0 or more, measured on a 2 mm-thick specimen, has a flow index of about 30 g/10 min or more, evaluated at 220° C. and a load of 10 kg according to ISO 1113, has an Izod impact strength of about 23 kg·cm/cm or more, evaluated according to ASTM D-256 (⅛", notched), and has a 60° gloss of about 97 or more, evaluated according to ASTM D528.

8. A molded article comprising the polycarbonate resin composition of claim 1.

9. The polycarbonate resin composition of claim 1, comprising about 20 to about 45 parts by weight of the polysiloxane-polycarbonate copolymer (B).

10. The polycarbonate resin composition of claim 9, comprising about 24 to about 45 parts by weight of the polysiloxane-polycarbonate copolymer (B).

* * * * *

UNITED STATES PATENT AND TRADEMARK OFFICE
CERTIFICATE OF CORRECTION

PATENT NO. : 8,673,997 B2  
APPLICATION NO. : 13/249438  
DATED : March 18, 2014  
INVENTOR(S) : Hwan Seok Park et al.

Page 1 of 1

It is certified that error appears in the above-identified patent and that said Letters Patent is hereby corrected as shown below:

In the Specification

Column 8, Line 29 reads: "8, 9, or parts by weight. Further, according to some embodi-"
and should read: "8, 9, or 10 parts by weight. Further, according to some embodi-"

Signed and Sealed this
Third Day of March, 2015

Michelle K. Lee
*Deputy Director of the United States Patent and Trademark Office*